Inventor
William M. Barret

Patented Jan. 8, 1952

2,581,349

UNITED STATES PATENT OFFICE 2,581,349

METHOD OF ELECTRICAL PROSPECTING

William M. Barret, Shreveport, La., assignor to Engineering Research Corporation, Shreveport, La., a corporation of Louisiana Application October 3, 1945, Serial No. 620,011

26 Claims. (Cl. 175—182)

This invention relates to the art of electrical prospecting, and more particularly to a method of utilizing electromagnetic waves to disclose the character and structure of the earth.

It is generally believed that when an electromagnetic wave, such as a radio wave, travels over the surface of the earth, the portion of the wave front near the earth lags behind the upper part of the wave front, and the wave front accordingly tilts forward. It is the conventional belief that for a fixed frequency the tilt of the wave front is governed by the electrical properties of the ground, the tilt generally decreasing as the conductivity and dielectric constant increase.

The present invention shows that the electrical characteristics of the ground are not alone responsible for the tilt of the wave front. It further shows that the wave tilt is influenced by the electrical properties of the subsurface media, as well as by the stratigraphy and structure of the said media.

The functioning of the invention preferably is based on the determination at a plurality of points on the earth's surface of the tilt of the wave front of an electromagnetic wave, such as a vertically polarized radio wave, and the use of the wave tilts thus observed to reveal useful subsurface information. The term "wave front" is here defined as any continuous surface in space at all points on which the electric vector has the same phase at the same time. Although the term does lose some of its significance in the case of intersecting beams of electromagnetic waves, where perhaps it would be more proper to refer to the resultant electric vector, nevertheless, "wave front" will generally be employed hereinafter for the sake of uniformity.

One of the objects of the invention is to provide a novel method of determining the depth of formation boundaries that reflect electromagnet waves, and thereby map the structure of the said boundaries.

Another object of the invention is to furnish an effective technique of locating and defining the character of geologic faults.

Another object is to make available a reliable method of locating and mapping buried masses whose electrical properties differ sufficiently from those of the surrounding media, such as buried salt domes, igneous plugs, dikes, metalliferous veins, or gold-placer deposits.

An aditional object is to furnish a practical method of locating and defining electrical discontinuities in buried strata, such as occur in a porous stratum at the boundary between salt water and petroleum, or when a reflecting zone "wedges out."

An additional object is to provide a convenient and accurate technique of determining various electrical characteristics of the subsurface media traversed by an electromagnetic wave.

A further object is to make available a method of determining other useful geophysical and geologic information for which the invention is adapted.

The utility of the invention and its operation will be understood from the description that follows and the accompanying drawings, wherein.

Figure 1:
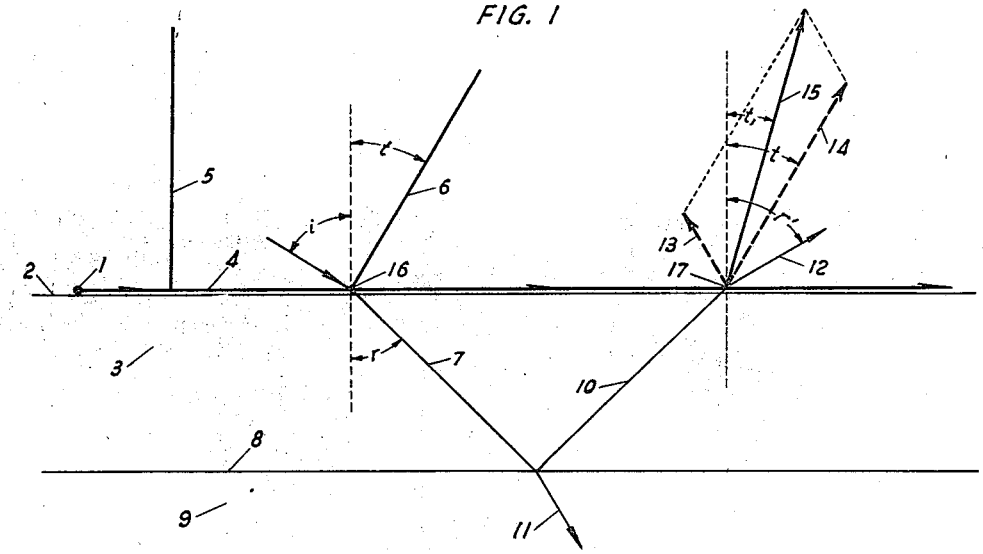
Fig. 1 illustrates diagrammatically the progressive tilt of an electromagnetic wave that travels along the earth's surface, is partially refracted therein, and finally combines with a wave reflected by a subsurface formation boundary.

Concerning the theory of operation of the invention, reference is made to Fig. 1, where a wave source, such as the transmitter 1, is positioned on the surface 2 of a plane earth 3 and emits monochromatic vertically polarized electromagnetic waves substantially along the line 4. At points in the immediate vicinity of the transmitter 1, the wave front 5 of the advancing wave 4 may be substantially vertical, but as the said wave moves farther from its source the currents set up in the earth 3 cause the wave front to tilt forward towards Brewster's angle, as indicated at 6, and the wave is partially refracted into the earth as shown by the ray 7. The wave enters the earth 3 at the angle of incidence $i$, and is refracted therein at the angle of refraction $r$, in accordance with Snell's law, which states that $\sin i/\sin r = n$, where $n$ is the index of refraction of the earth 3 with respect to air.

When the refracted ray 7 encounters a lithologic boundary, such as the horizontal boundary 8 between the formations 3 and 9, the said ray may be refracted along the path 11 and reflected along the path 10, the angle of reflection being equal to the angle of incidence at the said boundary 8. On reaching the surface 2, the reflected ray 10 will be refracted into the air along the path 12, the angle of refraction $r'$ being the same as the angle of incidence $i$. If 13 denotes the wave front (and electric vector) of the refracted ray 12, and if 14 denotes the wave front (and electric vector) of the surface wave 4, then these vectors will combine in space to give the resultant vector 15, whose amplitude and tilt $t_1$ are different from the amplitude and tilt $t$ of the vector 14. It is well to emphasize at this point that the vector relations shown in Fig. 1 apply only for an instant of time, since the surface wave 4 becomes elliptically polarized in traveling along the surface 2, and hence the vectors 13 and 14 represent the rotating resultant vectors of the respective field ellipses associated with the refracted ray 12 and the surface wave 4.

Thus the interface 8, separating the formations 3 and 9, causes a change in the amplitude and tilt of the resultant electric vector of the surface wave 4. Ignoring time phases, the change in amplitude and tilt will be determined by the intensity of the refracted ray 12, and this in turn will be influenced by the electrical properties of the formations 3 and 9. The distance between the points 16 and 17 will be governed by the depth of the interface 8, and the refractive index of the formation 3, the said distance increasing as the depth of the interface increases and as the refractive index decreases.

It is known from experience that, for practical purposes, the point 16 may be assumed to coincide with the position of the transmitter 1, and hence the distance (or spread) between the said transmitter and the point 17, where the change occurs in the amplitude and tilt of the electric vector, is a measure of the depth of the interface 8. It can be shown that the depth of the interface is given by the relation:

$$D = \frac{S_m \sqrt{n^2 - \sin^2 i}}{2 \sin i} \quad (1)$$

where D is the depth of the said interface; $S_m$ is the spread in the same units between the transmitter and the point at which the anomalous wave tilt first occurs, $S_m$ being the minimum spread for the detection of reflected rays from the said interface; $n$ is the refractive index of the formation 3, and $i$ is the angle of incidence.

It is to be understood that the reflected ray 10 represents the first ray returned to the surface 2 by the interface 8; that at points to the right of the point 16 the surface wave 4 continues to be refracted into the formation 3 at the angle $r$, and that at points to the right of the point 17 reflected rays continue to emerge from the formation 3 at the angle $r'$. It is evident, therefore, that once the tilt $t_1$ is established by the initial return of energy from the reflector 8, the said tilt will remain substantially uniform at points of observation to the right of the point 17.

Thus if observations of the wave tilt were made at successive points of observation along a traverse extending away from the transmitter 1, the said observations might indicate a progressive increase in the said tilt until the resultant electric vector of the wave 4 attained a tilt determined by the electrical properties of the formation 3, and this tilt would be maintained until the spread was sufficient to permit the detection of reflected rays from the boundary 8, where the tilt would abruptly change to a new value which would remain substantially constant as the spread was further increased.

It is indicated in Fig. 1 that the effect of the reflected energy is to decrease the tilt of the surface wave, but actually the angle $t_1$ may be greater or less than the angle $t$, depending on the relative amplitudes of the surface wave and the reflected waves, and on the phase difference, in both space and time, between the said surface wave and reflected waves. The relative amplitudes will depend, of course, on the attenuation suffered by the surface wave and the reflected waves in traversing their respective paths, and on the reflectivity of the boundary 8. The difference in space phase of the surface wave and the reflected waves will be determined by the angle of incidence $i$, by the refractive index of the formation 3, and by the mutual attitude of the surface 2 and the boundary 8; whereas the difference in time phase of the said waves will be governed not only by the variables here enumerated, but also by the depth of the boundary 8 and by the refractive index of the formation 9.

Under ordinary conditions the reflected waves from a shallow subsurface reflector, whose depth is quite small compared to the wave length in earth of the radiation employed, will have the effect of substantially reducing the wave tilt on combining with the surface wave. In view of the fact that a comparatively shallow water table is present in many areas, and that the top and/or base of such a water table will act as a good reflector of the electromagnetic waves used in connection with the instant invention, it will be found that the average tilt observed in practice ordinarily will be small; frequently of the order of 5 degrees for frequencies in the neighborhood of 2 megacycles (2,000,000 cycles per second).

After the surface wave travels about one wave length from the transmitter it normally assumes a tilt determined by the electrical properties of the ground, but at a like or somewhat greater spread the normal tilt may be reduced to a relatively small value by the presence of a shallow reflector, and thereafter the said surface wave may impinge on the earth's surface at an angle of incidence that is slightly less than 90 degrees, or at an angle approximating grazing incidence. Field experience with the invention indicates that this condition generally prevails, and that for spreads greater than several wave lengths it ordinarily may be assumed without serious error that the surface wave enters the earth at substantially grazing incidence, provided the said surface wave is propagated substantially along the preferred path indicated by the line 4 of Fig. 1, as will be referred to more particularly hereinafter. Since $\sin i = 1$ for grazing incidence, it accordingly follows that Equation 1 may be written:

$$D = \frac{S_m \sqrt{n^2 - 1}}{2} \quad (2)$$

The operation of the invention has been described in connection with but a single horizontal subsurface reflector, but it is clear that refracted rays, such as the ray 11, will continue downward until they encounter successively lower formation boundaries, and that the mechanism already set forth will be repeated at each boundary that separates media having different indices of refraction. Accordingly, a spread-tilt curve obtained along a traverse overlying a stratified geologic section would display a series of "breaks" that would correlate with the various subsurface reflectors returning energy to the earth's surface, and the respective spreads of the breaks would be a measure of the depth of the various reflectors, increasing spread corresponding to increasing depth.

Figure 2:
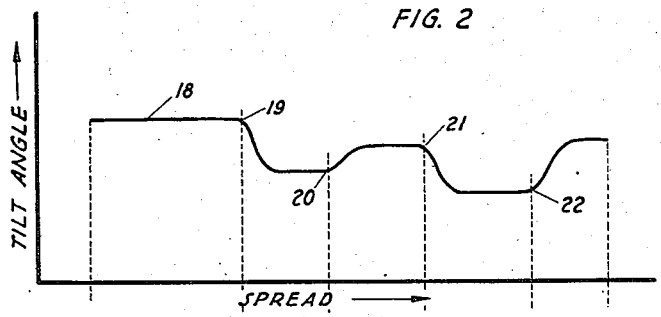
Fig. 2 is a graph showing the relation between the tilt angle and spread along a traverse that overlies the geologic section appearing in Fig. 3.
Figure 3:
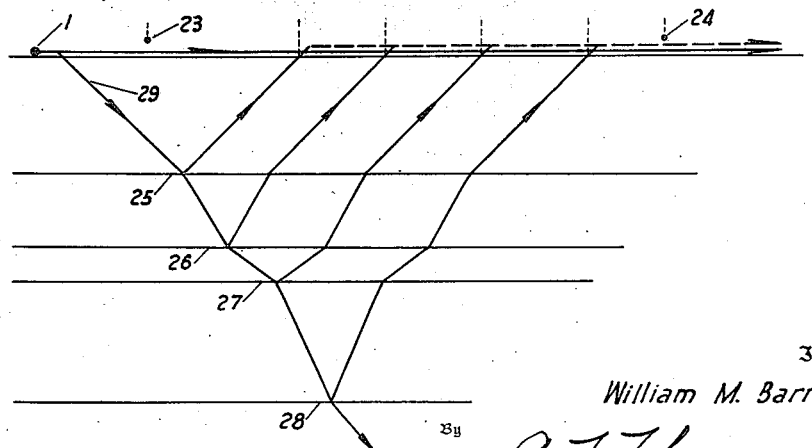
Fig. 3 is a diagrammatic sectional view of a series of strata that partially reflect an electromagnetic wave traveling the paths indicated.

These conditions are illustrated in Figs. 2 and 3, where the hypothetical spread-tilt curve 18 of Fig. 2 displays the breaks 19, 20, 21 and 22, obtained by taking successive tilt measurements along a traverse extending from the point 23 to the point 24, and when the radiation emitted by the transmitter 1 is partially reflected by the respective formation boundaries 25, 26, 27 and 28. In Fig. 3 it is assumed that the point 23 is removed a wave length or more from the transmitter 1, and that the advancing wave front has accordingly assumed a tilt determined by the electrical properties of the ground (surface and near-surface media) by the time it reaches the point 23. The spread-tilt curve may sometimes display the upward and downward displacements indicated by the curve 18 of Fig. 2, or it may evidence changes in gradient that persist over considerable traverse signals, and the breaks in the gradient may or may not be accompanied by the discrete departures or anomalies shown by the curve 18. Such gradient breaks may be initiated by subsurface reflectors having especially high reflectivity, and the said breaks may be correlated with their associated reflectors in the same manner as the breaks in the curve 18 are correlated with their related reflectors appearing in Fig. 3. Moreover, the reflected energy returning from depth may give rise to sharp local anomalies, represented by peaks or depressions in the spread-tilt curve, or it may display various combinations of the anomalous characteristics hereinbefore referred to.

It is not uncommon for the reflected energy from a subsurface formation boundary to cause a change in wave tilt of as much as 5 to 10 degrees. One will understand from this that as the surface wave moves away from the transmitter, as indicated by the line 4 of Fig. 1, its angle of incidence with the earth is constantly being changed at spread intervals determined by the underlying reflectors. The angle of incidence does, however, oscillate about an average value which generally differs but little from grazing incidence, and accordingly may be considered 90-degree incidence in the preferred and practical application of the invention. The average angle of incidence here referred to will be influenced by the electrical characteristics of the ground, and by the frequency of the surface wave, the said angle ordinarily decreasing as the frequency is increased. Worth noting at this point is the fact that at grazing incidence substantially no energy is transmitted into the earth, and that for a vertically polarized wave maximum transmission into the earth occurs at Brewster's angle. Thus as the angle of incidence of the surface wave oscillates between 90 degrees and Brewster's angle, the intensity of the refracted waves and the reflected waves varies respectively from substantially zero to a maximum. Energy considerations would therefore support an equilibrium position for the wave front, which is in conformity with the previous statement that the angle of incidence oscillates about an "average" value. The varying angle of incidence may, of course, be taken into account when greater precision is needed in the operation of the invention. This may be easily done, for a spread-tilt curve provides a means for determining the angle of incidence at various points along the surveyed portion of a traverse.

The rays refracted into the earth, such as indicated by the ray 29 (Fig. 3), travel a zigzag course through the various media, the ray path becoming steeper as the refractive index increases, and vice versa. Generally speaking, however, the average ray path of each refracted ray may be approximated by a straight line, and the average ray path of each reflected ray may likewise be approximated by a straight line.

Based on this approximation, and when the surface wave impinges on the earth at substantially grazing incidence, it will be found that, throughout much of the Mid-Continent and Gulf Coast oil-producing areas of the United States, the effective refractive index of most sedimentary media will lie between about 1.3 and 1.6 for frequencies of the order of 2 megacycles, so that the minimum spread at which a particular reflection is observed will respectively approximate 2.6 to 1.6 times the depth of the reflector responsible for the said reflection. Practical experience with the invention has shown that an average value of 2.0 may generally be used for the ratio of spread to depth, with a corresponding effective refractive index of 1.4. This relation makes it possible to determine roughly the depths of various geologic strata, and other electrically anomalous masses, from the breaks exhibited by spread-tilt curves.

More accurate depth determinations may be arrived at if a well has been drilled in the neighborhood that provides a log showing the depths of the various subsurface reflectors. By obtaining a spread-tilt curve in the vicinity of the well, the various breaks in the curve may be correlated with the respective depths of the related reflectors, and the effective index of the section overlying a particular reflector may then be found from the relation:

$$n = \sqrt{\left(\frac{2D}{S_m}\right)^2 + 1} \qquad (3)$$

where the notation is the same as set forth in connection with Equation 1. Furthermore, the effective index of each individual stratigraphic unit may likewise be determined by commencing with the uppermost reflector, and progressively extending the computations downward. The refractive index or indices thus found may then be used in the same general area to compute unknown reflector depths from other spread-tilt curves.

One will understand that the depth of a significant reflector or reflectors may be determined at various locations in a given area by running a spread-tilt curve at or near each of the said locations. The configuration of the reflector or reflectors can then be displayed by the well-known procedure of contouring. The contours may be based on quantitative depths that require the estimation or determination of the refractive index, or they may be based on qualitative depths, whereby the respective breaks in various spread-tilt curves are correlated against one another without reference to the refractive index of the media involved. With the latter procedure a decrease in the spread of a particular curve break would indicate a decrease in the depth of the associated reflector, and vice versa, but the actual change in depth would not be considered.

The quantitative or qualitative mapping of various subsurface formations is one of the most important functions of the invention, for by so doing it is possible to locate and define anticlinal folds, structural noses and terraces, and other types of geologic structures which frequently provide traps for the accumulation of petroleum and natural gas.

From what has gone before it is evident that the invention may also be employed to locate and trace geologic faults, since the vertical displacement that occurs between the respective reflectors at the zone of faulting may be recognized and determined by means of spread-tilt curves run along traverses which intersect the strike of the fault. Reflected energy from the fault plane itself will also cause anomalous wave tilts, and thereby provide an alternative method of locating and identifying such structural features.

Furthermore, buried salt domes, igneous plugs, dikes, metalliferous veins, gold-placer deposits, and many other discrete masses may likewise be located and delineated with the invention, for the refractive indices of such masses generally with differ sufficiently from those of the surrounding media to give rise to interpretable reflections on spread-tilt curves obtained along the surface overlying the said masses.

Another important application of the invention is to locate and define electrical discontinuities in buried strata, such as the discontinuity that occurs in a porous stratum at the peripheral boundary of a buried oil accumulation, where the said accumulation usually is in contact with salt water, or when a reflecting zone "wedges out." Such discontinuities ordinarily cause a change in amplitude and a shift in phase between the reflected rays from the two sides of the discontinuity, and thereby reveal their presence and location by means of breaks in spread-tilt curves secured along traverses that cross over the said discontinuities. In the case of the boundary between petroleum and salt water, or between petroleum and adjacent sedimentary material, a curve break occurs substantially over the boundary and another break occurs at a particular distance beyond the said boundary, as measured from the wave source. The first-mentioned break is called the "contact break," and its occurrence may be explained on the basis of diffraction phenomena, while the other break is termed the "delayed break," and its character and position on the traverse are determined by the amplitude and phase changes at the oil boundary and by the depth of the said boundary. The separation along the traverse of the contact break and the delayed break is denoted the "delayed-break spread," and is given by:

$$S_{db} = \frac{D}{\sqrt{n^2 - 1}} \qquad (4)$$

where $S_{bd}$ is the delayed-break spread, $D$ is the depth of the said boundary, and $n$ is the effective refractive index of the media overlying the boundary. It will be understood, then, that the invention not only furnishes a method of locating the peripheral boundary of an oil accumulation, but it also makes it possible to compute the depth of the said boundary. The horizontal outline of an oil accumulation having sufficient areal extent may be determined by positioning the transmitter over the oil-saturated area and then obtaining tilt measurements along radial traverses directed substantially toward the transmitter, the traverses being long enough to permit detection of the respective contact breaks and delayed breaks. The positioning of the transmitter, for the development of contact anomalies of best definition, may be done in accordance with the teachings set forth in applicant's United States Patent No. 2,172,688, issued September 12, 1939, under the title "Electrical Apparatus and Methods for Geologic Studies," or it may be done in the manner disclosed in applicant's copending application Serial No. 516,559, filed December 31, 1943, which is now abandoned.

Conversely, the effective refractive index may be found for the media overlying an oil boundary if the delayed-break spread is known, and if the depth of the said boundary is known. The index is expressed by the relation:

$$n = \sqrt{\left(\frac{D}{S_{db}}\right)^2 + 1} \qquad (5)$$

It is obvious that when a lithologic unit, such as a porous zone carrying salt water, wedges out, the condition may be indicated by spread-tilt curves secured along a traverse or traverses that pass over the edge of the said zone, since the said curves will display the convergence of the reflections from the upper and lower surfaces of the said zone as the said edge is approached.

It is well to mention in this connection that recognizable reflections may be obtained from the top and bottom of practically any formation of reasonable thickness lying within the depth range of the invention, and that especially strong reflections usually are caused by porous beds, such as those constituting suitable reservoirs for petroleum and natural gas.

In the foregoing discussion and in Equations 2 to 5 inclusive, it is assumed that the electromagnetic energy enters the earth at substantially grazing incidence ($i = 90°$), and that it also emerges therefrom at substantially grazing incidence ($r = 90°$). This assumption is entirely acceptable when the earth's surface is approximately parallel to the underground reflector, and the assumption is permissible within engineering tolerances when their departure from parallelism does not exceed some three degrees, which is equivalent to a departure of about 300 feet per mile.

Dips of underground strata in excess of some 300 feet per mile are exceptional throughout much of the oil-producing area of the United States, and therefore the simplifying assumption of grazing incidence ordinarily is applicable. However, structural dips of far greater magnitude are sometimes encountered, and in such cases the reflected energy will not emerge at grazing incidence. When the subsurface reflector dips downward at a comparatively steep angle toward the receiving means, the reflected rays may be totally reflected at the air-earth interface and hence may not emerge from the earth. Transposition of the transmitter and receiver will overcome the difficulty, but when this is done the reflector has a pronounced dip downward toward the transmitter, and accordingly the angle of refraction $r'$ may be considerably less than 90 degrees. This condition will lead to recurrent constructive and destructive interference between the surface rays and the reflected rays, so that the wave tilt will increase and decrease in a cyclic manner along the traverse. Denoting the distance along the traverse between successive maxima or minima (or other like points) of the spread-tilt curve by $\Delta S$, it can be shown that the following relation applies when the incident waves enter the earth at substantially grazing incidence:

$$\Delta S = \frac{1}{C}\Big[B\cos 2\theta \sin\phi + S\cos^2\phi - A(Q-\lambda) + \sqrt{[A(Q-\lambda) - S\cos^2\phi - B\cos 2\theta \sin\phi]^2 + \lambda C(2Q-\lambda)}\Big] \quad (6)$$

in which $A = 1 + \sqrt{n^2-1}\sin 2\theta \sin\phi$ $B = S\cos 2\theta \sin\phi + d\sin 2\theta$ $C = (2\sqrt{n^2-1} + n^2 \sin 2\theta \sin\phi)\sin 2\theta \sin\phi$ $Q = \sqrt{B^2 + S^2 \cos^2\phi}$ and where $s$ is the spread between the transmitter and the beginning of the $\Delta S$ traverse interval; $d$ is the depth of the reflector vertically below the transmitter; $\theta$ is the angle between the reflector and the earth's surface, $\theta$ being positive when the slope of the reflector is downward from the receiver to the transmitter, and negative (or $\pi - \theta$) when the slope is downward to the receiver; $\phi$ is the angle between the traverse and the strike of the reflector, $\phi$ being a positive acute angle in all cases; $n$ is the effective refractive index of the material overlying the reflector, and $\lambda$ is the wave length (in air) of the radiation emitted by the transmitter; $\lambda$, $\Delta S$, $s$ and $d$ being expressed in the same units.

Equation 6 holds true for all cases in which $$\frac{B\cos 2\theta \sin\phi + S\cos^2\phi}{Q} - A < 0 \quad (7)$$

but when the left-hand side of Equation 7 is greater than zero, then $$\Delta S = \frac{1}{C}\Big[B\cos 2\theta \sin\phi + S\cos^2\phi - A(Q+\lambda) - \sqrt{[A(Q+\lambda) - S\cos^2\phi - B\cos 2\theta \sin\phi]^2 - \lambda C(2Q+\lambda)}\Big] \quad (8)$$

When the traverse makes an oblique angle with the strike of a dipping reflector, and $n$ and $\lambda$ remain substantially constant, Equations 6 and 8 show that $\Delta S$ increases slowly as the depth of the reflector decreases if the dip of the reflector is positive, and $\Delta S$ increases slowly as the depth increases for negative dips of the reflector. For positive reflector dips, $\Delta S$ increases slowly as the spread increases, and for negative reflector dips $\Delta S$ increases slowly as the spread decreases. Also, for both positive and negative dips of the reflector: $\Delta S$ increases rapidly as the dip decreases, becoming infinite when $\theta = 0$, and it increases rapidly as the angle between the traverse and the strike of the reflector decreases, becoming a maximum when $\phi = 0$. The change in $\Delta S$ for changes in $d$, $\theta$, $\phi$ and $s$ is more rapid for negative dips than for like positive dips, and for given values of $d$, $\theta$, $\phi$ and $s$, $\Delta S$ is numerically larger for negative dips than for like positive dips.

When the traverse is oriented normal to the strike of a dipping reflector, it will be noted that $d$, $\phi$ and $s$ drop out of Equations 6 and 8, so that $$\Delta S = \frac{\lambda}{(\sqrt{n^2-1} + \tan\theta)\sin 2\theta} \quad (9)$$

For this case it will be found that if $n$ and $\lambda$ remain substantially constant, $\Delta S$ is independent of the depth of the reflector and independent of the spread between the transmitter and receiver, but it increases rapidly as the dip of the reflector decreases, for both positive and negative dips, provided the dip does not exceed some 2,000 feet per mile (about 21 degrees.) Throughout most of this dip range $\Delta S$ generally is somewhat larger for negative dips than for like positive dips.

For a traverse that is parallel to the strike of a dipping reflector, $n$ and $\phi$ may be eliminated from Equations 6 and 8, thus resulting in the following simplified expression:

$$\Delta S = \frac{\lambda}{2} \cdot \frac{2\sqrt{d^2 \sin^2 2\theta + S^2} - \lambda}{\sqrt{d^2 \sin^2 2\theta + S^2} - (S+\lambda)} \quad (10)$$

For the case considered, and when $\lambda$ remains substantially the same, $\Delta S$ increases rapidly as the depth of the reflector decreases; it increases rapidly as the dip of the reflector decreases, and it also increases rapidly as the spread increases. Since the transmitter and receiver are located along the strike of the reflector, no consideration need be given the sign of the dip. It should be pointed out that for this case $\lambda S$ tends to become infinite as the depth decreases and as the dip decreases, and for the values of $d$, $\theta$ and $\lambda$ usually encountered in practicing the invention, the magnitude of $\Delta S$ is too large to be observed on a traverse of ordinary length.

In the event the traverse passes over a reflector that is parallel to the earth's surface (on which the traverse preferably is located), and the reflector dip is accordingly zero, then no recurrent anomalies will be caused by the said reflector, as already shown in connection with Equations 1 and 2 set out hereinbefore.

Thus it is seen that when a spread-tilt curve displays but a single anomaly for a single reflector, it signifies that the said reflector has no dip with respect to the traverse on which the said curve was obtained. When the reflector has an appreciable dip, then the spread-tilt curve will exhibit recurrent anomalies whose separation along the traverse ($\Delta S$) provides criteria for determining the dip of the said reflector. It is evident that in either event the anomalous variations also enable one to find the depth of the reflector and the index of refraction of the media overlying the reflector. In fact, Equations 6 and 8 may be solved simultaneously for any number of unknown quantities by obtaining spread-tilt curves along a like number of non-parallel traverses that pass over a dipping reflector, and then substituting in the said equations the data shown by the said curves. The anomalous character of spread-tilt curves accordingly makes possible the qualitative or quantitative determination of important geological and geoelectrical data within an unknown area. Obviously the procedure may be simplified by having available some subsurface information from previous drilling.

The relations set forth in Equations 6, 8, 9 and 10, and in the discussion related thereto, furnish a novel method of mapping the attitude (and depth) of subsurface reflectors, thereby providing a technique of locating structural features that are favorable for the accumulation of petroleum and natural gas. For example, the location and configuration of a domal structure, which frequently forms an excellent trap for oil and gas, may be found by obtaining tilt measurements long traverses oriented at various and suitable positions and angles within the area embracing the said domal structure. Spread-tilt curves secured in one or both directions along said traverses would furnish criteria for determining the direction and magnitude of the reflector dips at different locations within the said area, and thus define the location and configuration of the said domal structure. The method here disclosed is not restricted to the use of wave-tilt measurements, but is also operative with various field parameters, in accordance with the teachings appearing in applicant's aforesaid copending application Serial No. 516,559.

In connection with the discussion of the equations hereinbefore set out, particularly Equations 3 and 5, a method was disclosed for finding the effective refractive index of the medium or media overlying a reflector of electromagnetic waves. An extension of the method makes possible the determination of two other important electrical properties of the said medium or media, namely, the dielectric constant and the conductivity. The determination preferably is made by obtaining two (or more) spread-tilt curves at different frequencies along a traverse overlying a substantially horizontal reflector whose depth is known, and then solving for $n$ at each frequency by means of either Equation 3 or 5. Alternatively, the procedure may involve a dipping reflector whose depth and dip are known, and $n$ may be computed with the aid of Equation 6, 8 or 9. Using the values of $n$ thus found, the dielectric constant and conductivity may be determined by the simultaneous solution of the following equation, which expresses the relation between $n$ and frequency for a vertically polarized electro-magnetic wave incident on the air-earth interface:

$$n=\sqrt{\frac{1}{2}\left[\mu\epsilon+\sin^2 i+\sqrt{\left(\frac{2\mu\sigma}{f}\right)^2+\left(\mu\epsilon-\sin^2 i\right)^2}\right]} \quad (11)$$

wherein $\mu$ is the magnetic permeability in electromagnetic units, which ordinarily may be considered unity, $\epsilon$ and $\sigma$ are respectively the dielectric constant and conductivity in electrostatic units, $f$ is the frequency in cycles per second, and $i$ is the angle of incidence made by the wave in air. When grazing incidence is involved, $\sin i=1$, and this results in a simplification of Equation 11.

The invention consequently provides a method of finding at selected frequencies the refractive index, dielectric constant and conductivity of geologic media traversed by an electromagnetic wave. Another important characteristic of the media, and one that influences greatly the operation of the so-called "high-frequency" methods of electrical exploration, is the "absorption factor," $\beta$, which may be found, after $\epsilon$ and $\sigma$ are known, from the expression:

$$\beta=\sqrt{\frac{\mu}{2}\left(\sqrt{\epsilon^2+\frac{4\sigma^2}{f^2}}-\epsilon\right)} \quad (12)$$

in which the magnetic permeability $\mu$ again may be considered unity for most sedimentary materials and independent of frequency. Having determined $\beta$ for a given medium (or media), the attenuation suffered by a wave in traversing the said medium is given by the relation:

$$E_x=E_0 e^{-\frac{2\pi\beta x}{\lambda}} \quad (13)$$

where $E_0$ is the amplitude of the incident wave, $E_x$ is the amplitude of the wave after traveling the distance $x$ through the medium, $e$ is the base of natural logarithms, and $\lambda$ is the wave length in free space, $\lambda$ and $x$ being expressed in the same units.

It will be noticed in Equation 11 that the refractive index decreases with increasing frequency, and vice versa. This relation is important, since the functioning of the invention is based on the occurrence of subsurface electrical discontinuities, or more particularly, on the presence of boundaries separating media having different indices of refraction, and it is seen that the index of each of the media may be controlled by varying $f$. As the reflection coefficient of a particular boundary is dependent on the refractive indices of the media on each side of the said boundary, it follows that the said reflection coefficient may be changed through wide limits by manipulating the frequency of the radiation. Inasmuch as the electrical properties of the various media probably will differ considerably from one another, the reflection coefficients of the several boundaries separating the said media will likewise behave differently under changing frequency, and hence the reflections from a given boundary may be emphasized while discriminating against the reflections from other boundaries. Conversely, the reflectivity of a given boundary may be decreased by a proper adjustment of the frequency, whereas the reflectivity of another boundary or boundaries may be simultaneously increased.

Furthermore, since the average magnitude of the related breaks disclosed by a representative number of spread-tilt curves is a measure of the amplitude of the emergent waves, it will be understood that the invention furnishes a technique of studying wave transmission as a function of frequency. As here used, the term "wave transmission" takes into account not only attenuation, but also the frequency dependence of the path length and the reflection coefficient of each subsurface interface through which the wave passes in its progress downward to a reflector and in its return to a receiving means near the earth's surface. By experimentally determining the effectiveness of the wave transmission at different frequencies, the invention therefore provides a direct method of finding the optimum frequency to be used in solving any subsurface problem involving reflection and/or refraction and/or diffraction phenomena.

Not only does a general functional relation exist between the frequency and the refractive index, dielectric constant, conductivity and absorption factor, and between the frequency and wave transmission, but the variables specified change in an anomalous manner throughout certain frequency bands, owing to the fact that many geologic media exhibit selective frequency characteristics. The optimum frequency to be used in practicing the herein described invention will accordingly vary with the electrical properties of the geologic media under examination, and may be found as set forth. It is to be understood that the operation of the said invention contemplates the use of any frequency that will, with the power available at the wave source, cause an electromagnetic disturbance to travel from the said wave source to the required depth, and thence back to a receiving means. The possible frequency range that may be utilized in practice will therefore be large. For present purposes it may be said that successful operation of the invention has been secured with a wave source that was capable of transmitting 80 watts at a frequency of 1.90 megacycles.

Since the refractive index decreases with increasing frequency and increases with decreasing frequency, as shown by Equation 11, it is possible to control the underground path of the refracted wave by manipulating the frequency of the surface wave. As $\sin r = \sin i/n$ (Fig. 1), it will be understood that the slope of the ray path 7 may be decreased by increasing the frequency, or it may be increased by decreasing the frequency. This relation between the frequency of the incident radiation and the geometry of the underground wave path makes possible an alternative mode of operation of the invention, the scope of which is outlined in what follows.

Suppose that a wave source is positioned near the point 16 in Fig. 1; that a receiving means is located near the point 17, and that it is desired to determine the presence and depth of the reflector 8 without varying the spread between the said wave source and the said receiving means. Now imagine that the wave source is functioning at a comparatively high frequency, and that the slope of the paths of the refracted ray 7 and the reflected ray 10 was thereby so reduced that the said ray 10 returned to the surface 2 at some point to the right of the receiving means located at the point 17. Measurements with the said receiving means would accordingly determine the wave tilt of the surface wave 4. If the frequency of the surface wave were then reduced progressively, the angle between the rays 7 and 10 would likewise decrease, and the point at which the reflected ray 10 emerged from the surface 2 would move to the left toward the receiving means placed at the point 17. At some particular frequency the said ray 10 would arrive at the point 17, as indicated in Fig. 1, and then the wave tilt observed by the said receiving means would show an anomalous variation indicative of the composition of the reflected wave with the surface wave. The said anomalous variation could be shown conveniently by a graph displaying the relation between the frequencies employed and the corresponding wave tilts observed at the receiving means.

If the variable-frequency observations were carried out over multiple parallel reflectors such, for example, as shown in Fig. 3, and if the measurements were commenced at a relatively high frequency and then gradually extended to progressively lower frequencies, the first reflection (and anomalous wave tilt) indicated by the receiving means would evidence the presence of the uppermost reflector, and as the frequency was further decreased and the wave paths thereby steepened, the next lower reflector would cause another anomaly in wave tilt, and so on until the lowermost reflector would be indicated by the receiving means when the frequency was low enough, and the wave paths steep enough, to permit detection of the first reflected ray from the said lowermost reflector. It is clear that in the operation here outlined the variation in frequency is analogous to the variation in spread with the preferred mode of operation already described.

There is, however, an important difference between the two techniques which becomes operative after the detection of the initial reflection from a particular reflector. In the case of the preferred method, a single electrically homogeneous subsurface reflector that lies substantially parallel to the earth's surface will cause but a single discrete anomaly and/or gradient break, but with the alternative variable-frequency procedure such a reflector will cause an initial anomaly, and spaced therefrom in frequency, there will be recurrent anomalies of the same general character. The recurrent anomalies are due to constructive and destructive interference between the reflected wave and the surface wave, the said interference arising from the change with frequency in the optical lengths of the wave paths.

The depth of a given reflector may be determined with the variable-frequency technique from the said initial anomaly, in accordance with the procedure set forth in connection with Equation 2, since the spread may be readily measured and the refractive index may be found for the frequency that correlates with the said initial anomaly. Alternatively, the depth of the reflector may be determined from the magnitude of the frequency increment between the said recurrent anomalies, the said increment increasing with decreasing reflector depths, and vice versa. Furthermore, the amplitude of the recurrent anomalies will vary with the intensity of the reflected waves, and hence the frequency dependence of the reflection coefficient of a particular reflector, and the frequency dependence of the attenuation suffered by a wave in traversing the media overlying a reflector, may be investigated by noting the change in amplitude of the said recurrent anomalies as the frequency is varied. In this manner the frequency may be found that results in emphasizing the reflections at a given reflector, or in suppressing the reflections at a given reflector, or the "optimum frequency" for a particular application may be found. Such findings may be used to advantage in practicing the constant-frequency method described herein, and in practicing various other electromagnetic methods disclosed in the prior art. The technique here described may also be advantageously incorporated in the method disclosed in applicant's copending application Serial No. 383,770, filed March 17, 1941, now Patent No. 2,426,918.

One will recognize that the variable-frequency procedure may be used, as already explained in the discussion of the preferred "single-frequency" method, to find the depth and dip of a dipping reflector, whether or not the said reflector contains oil and/or water, or to determine the effective refractive index of the geologic media overlying a particular reflector, or to investigate the electrical characteristics of the said media. Moreover, the said procedure may be utilized effectively in mapping the presence and location of buried oil boundaries and other types of electrical discontinuities, since lateral variations in the refractive index of the reflecting medium, such as may occur at the peripheral boundary of an oil deposit surrounded by salt water, will result in variations in the amplitude and/or phase of the reflected wave, and thereby cause corresponding changes in the wave tilt observed at the receiving means. An oil boundary (or other similar electrical discontinuity) may be detected in this manner by positioning the transmitting means and the receiving means at the earth's surface, on opposite sides of the said boundary. As the frequency is varied, the apex of the angular path traveled by the underground wave will move across the reservoir containing the oil, and the receiving means will evidence anomalous tilts when the said apex passes the said oil boundary.

In practicing the variable-frequency method under consideration, the spread between the transmitting means and the receiving means remains fixed while observations of the wave tilt are made with the receiving means at different frequencies, and then, if required, the procedure may be repeated for different spreads, and/or for other locations of the said transmitting and receiving means, until the desired information is secured concerning the discontinuity or discontinuities under investigation.

No consideration is given herein to "sky waves" that might reach the receiver by reflection from the ionosphere. Waves of this kind are ordinarily of no consequence in the operation of the invention, for its observations normally are carried out during daylight hours and at distances generally less than 10 miles from the transmitter. Moreover, no account has been taken of waves that may reach the receiver after being refracted along a subsurface interface separating media having different indices of refraction. It is not to be inferred from this that this type of refraction phenomenon is never involved in the operation of the invention, but rather that the theory of operation set forth herein, which is predicated primarily on the reflection of waves at subsurface boundaries of discontinuity, offers a simple and effective explanation of the invention's theory of operation, and a satisfactory basis for its practical application.

In the early part of this specification it was indicated that the electrical characteristics of the ground are partly responsible for the tilt of the wave front. It will be found that if the earth were a homogeneous and perfect conductor the wave tilt for a vertically polarized wave would be zero degrees, and if the earth were a homogeneous and perfect dielectric the tilt would approach a maximum value of about 27 degrees as the dielectric constant approached a value of 2, since $$t = \tan^{-1} \frac{\sqrt{\epsilon - 1}}{\epsilon}$$

when $\epsilon$ is the dielectric constant of the earth medium. But the earth is not homogeneous, and it is neither a perfect conductor nor a perfect dielectric. It is, in fact, composed of stratified media having different indices of refraction, the said media being partially conducting but behaving more like a dielectric than a conductor at frequencies of the order of a megacycle or more.

Were it not for the energy returned to the earth's surface by underground reflectors, and in the absence of a sky wave, the wave tilt would for a fixed frequency be governed by the electrical properties of the ground, as is the conventional belief, but according to the teachings of the present invention the wave tilt is primarily controlled by the reflected energy, rather than the electrical characteristics of the ground. This conclusion has far-reaching import, for it implies that the customary procedure of determining ground conductivities and dielectric constants at radio frequencies by means of measurements involving the wave tilt is not a sound practice, and frequently will lead to serious errors in the values arrived at.

On first thought it would appear that the reflected energy from subsurface reflectors would arbitrarily increase or decrease the wave tilt resulting from the electrical properties of the ground, depending on the phase relations and amplitudes of the surface wave and the reflected waves. If this were the case, then the computed conductivities and dielectric constants of the ground would as likely be too low as too high. It will be found, however, that the average wave tilt observed in practice is usually much less than would be the case if the tilt were determined entirely by the electrical properties of the ground. This is for the reason already set forth herein, namely, that a comparatively shallow reflector, such as a water table, is present in many areas, and that such a reflector ordinarily causes a large decrease in the wave tilt observed at the earth's surface. The reduced tilt usually will lead to a ground conductivity and dielectric constant that are far higher than the true values. Such determinations may accordingly be subject to gross errors.

It may be remarked here that the occurrence of negative tilt angles, which frequently are reported in the radio art and also are observed at times in the operation of the instant invention, are entirely consistent with the theory of operation set forth herein, but are at complete variance with the concept that for a fixed frequency the wave tilt is determined solely by the electrical properties of the ground. In this connection it may be pointed out that when the electrical properties of the ground remain the same, and when underground reflectors may be ignored, the tilt of the wave front increases as the frequency of the wave increases.

It is true that the tilt measurements involved in the operation of the present invention are taken at comparatively small distances from the wave source, generally less than some 10 miles, and that conductivity and dielectric constant determinations oftentimes are based on tilt measurements made at distances of a hundred miles or more from the wave source.

The great difference in distances does not, however, alter the fact that each of a vast number of underground reflectors within the intervening distance has contributed its effect at the point of observation, and hence the influence of the reflected energy will in most cases be present to vitiate conductivity and dielectric constant determinations by wave-tilt measurements.

The effect of variations in the electrical properties of the ground on the wave tilt causes no difficulty in the operation of this invention, since such variations generally will occur progressively over a considerable distance, and thus will not be confused with the sharp curve breaks ordinarily associated with underground reflectors. Moreover, any possible distortion of a spread-tilt curve by a change in ground conductivity or dielectric constant would rarely if ever be so repeated on adjacent traverses as to be confused with the reflections from a particular subsurface reflector. And finally, such variations in wave tilt as are caused by changes in the electrical properties of the surface and near-surface media can usually be anticipated and identified by available surface geologic maps, as the conductivity and dielectric constant changes are closely related to the distribution of the surface formations delineated by such maps.

One should understand that in the conventional determination of the electrical properties of the ground by wave-tilt measurements, where the observations generally are made at arbitrary and widely separated points which are far removed from the wave source, the anomalous wave tilts herein attributed to subsurface reflectors probably would not be observed, and certainly would not be properly appraised. This conclusion is confirmed by the fact that the prior-art teachings ascribe all tilt variations to changes in frequency and/or the electrical characteristics of the ground. Only when the tilt measurements are made at comparatively small distances from the wave source, and when the spread variation is comparatively small between successive measurements, is it possible to observe the occurrence and character of the anomalous wave tilts referred to herein, and to correlate such tilts with underground reflectors. Measurements thus performed are clearly in accordance with the teachings of the instant invention. It should not be inferred, therefore, that the invention is a natural outgrowth or refinement of the earlier technique, for it is obvious that it embodies novel method steps which are physically different from those disclosed in the prior art; that the operation of these method steps furnishes useful geologic and geophysical information concerning the earth, and that the results so obtained would be completely unexpected and impossible in the performance of the prior methods.

Various types of transmitters and receivers may be used in practicing the invention, and different kinds of transmitting and receiving antennas may also be employed. Consider first the preferred method, wherein the frequency ordinarily is maintained substantially constant during a series of observations, and the spread between the sending means and the receiving means is varied. For this mode of operation the transmitters and receivers disclosed in applicant's aforesaid Patent No. 2,172,688 may be used successfully. The transmitting antenna described in the said patent may be employed in practicing the invention, but it is preferable to utilize the radiating means set forth in applicant's copending applications Serial No. 483,638 filed April 19, 1943, and Serial No. 584,960, filed March 26, 1945, since the said means are especially suited to the propagation of a strong surface wave that travels along the air-earth interface, as diagrammatically illustrated by the line 6 of Fig. 1. Alternatively, the radiating means may comprise a single wire that is located a foot or so above the earth's surface and approximately parallel thereto; that lies substantially in the vertical plane that includes the receiver stations, and that has a length approximating one-quarter the length (in air) of the propagated waves. The preferred type of receiving antenna consists of a doublet made up of two collinear rods, each measuring about two feet in length, and connected to the receiver by means of a "balanced" input circuit. The doublet preferably is mounted on a tripod provided with a compass, levels, and a "universal" tripod head, so that the orientation in space of the doublet may be varied and measured by means of graduated vertical and horizontal reference scales. This arrangement makes possible the convenient and accurate determination of the position in space of the resultant electric vector, and consequently the wave tilt, when operated in accordance with well-known manipulative techniques. For illustration, reference is made to page 294, lines 15-25, of the book "High Frequency Measurements," by A. Hund, published by McGraw Hill Book Company, New York, N. Y., 1933. It also provides a reliable means for measuring the magnitude of the said resultant vector, and for determining the magnitude and orientation of the major and minor axes of the field ellipse, which measurements may be useful at times in carrying out the methods disclosed herein.

With further reference to the transmitting and receiving means used in practicing the invention, it should be brought out that, with certain of the modes of operation disclosed herein, the invention's theory and operation may be postulated on the use of highly directive radiating and/or receiving means, whereby electromagnetic waves are "beamed" from locations above, in or below the air-earth interface, thus obviating the necessity of propagating a surface wave as required by the preferred mode of operation.

In obtaining spread-tilt curves with the aforesaid apparatus, the spread may be varied by maintaining the transmitter in a fixed location while the receiver is moved with respect to the transmitter, or the transmitter may be moved while the receiver remains fixed, or both the transmitter and the receiver may be moved during a series of observations, so as to restrict the electrical investigation substantially to a vertical line situated approximately midway between the said transmitter and receiver. In the preferred mode of operation the receiver locations are arranged along a substantially straight traverse directed substantially toward the transmitter, but this is not to be considered a necessary requirement, for it is obvious to anyone skilled in the art that the invention is operative when the said locations are otherwise disposed, and when the said traverse is otherwise directed. Successive wave-tilt measurements may be made with the receiver and/or transmitter positioned at discrete stations, or continuous wave-tilt measurments may be made with the receiver and/or transmitter in motion, it being understood that continuous operation may be obtained by mounting the movable unit (or units) in a truck or other vehicle. When the transmitter is so mounted, its antenna may be a top-loaded vertical radiator, with the chassis of the vehicle serving as a counterpoise. Radiation from such an antenna may be incident on the earth's surface at an angle considerably less than 90 degrees, and this should be taken into account when using a radiator of this type. When a mobile receiver is employed, its doublet antenna may be placed to one side of the vehicle, or at some other suitable location. The term "vehicle" is here used in its broadest sense, and as such it may include an airplane, a submarine, or any other form of transportation.

The permissible spread variation between successive receiver observations is determined by the subsurface problem involved. In mapping buried strata a spread increment of 25 feet usually gives good definition, and fair definition is often secured with an increment of as much as 250 feet. The spread increment should, however, not exceed twice the thickness of the thinnest stratum to be mapped. In locating and delineating electrically anomalous masses such as oil accumulations, salt domes, igneous plugs, faults, etc., the spread variation between successive receiver observations ordinarily may be of the order of 100 to 500 feet. In mining problems involving the configuration of bed-rock channels, gold-placer deposits, etc., the spread increment may have to be decreased to five or 10 feet, depending on the areal dimensions of the geologic feature under examination.

The preferred operation of the invention is based on the use of continuous and unmodulated vertically polarized sinusoidal electromagnetic waves whose frequencies lie in the radio spectrum. One versed in the art of electrical prospecting will understand, however, that the operation may be based on the use of interrupted waves instead of continuous waves; that various types of modulated waves may be employed to replace the preferred unmodulated waves; that different kinds of polarizations and wave forms may be substituted for the vertically polarized sinusoidal waves specified, and lastly, that electric currents or pulses may be used in the place of the electric waves considered herein.

In the preferred mode of operation the frequency and amplitude of the waves radiated by the transmitter are maintained substantially constant, but this is more a matter of convenience than a requirement. As has been pointed out previously herein, the refractive indices of geologic media are functionally related to the frequency of the incident radiation, and hence large changes in frequency during a series of observations with the invention would accordingly introduce uncertainties in its operation, since it would change the magnitude of the spread at which a particular reflection appears on the spread-tilt curve. Small frequency variations do not, however, cause any difficulties. The amplitude of the radiation may vary between wide limits while taking a series of tilt measurements without influencing the functioning of the invention.

Various types of well-known apparatus may also be used in practicing the variable-frequency technique disclosed earlier herein. For example, the transmitting and receiving means may be of the form described in applicant's aforesaid Patent No. 2,172,688, and the frequency may be varied by changing the piezo-electric crystals embodied therein; or the said transmitting and receiving means may be similar to those described in applicant's aforesaid copending application Serial No. 584,675, now Patent No. 2,573,682. In either event, however, the doublet receiving antenna and associated tripod mounting, which were referred to previously, may be used to advantage in the accurate determination of wave tilts. One of the desirable characteristics of the transmitting means is that it propagate a strong surface wave substantially along the earth's surface in the direction of the receiving means, and the said transmitting means should, like its associated receiving means, be capable of effective operation throughout the required frequency spectrum.

With either the preferred "single-frequency variable-spread method," or the alternative "variable-frequency constant-spread method," it is preferable that the transmitting means propagate electromagnetic waves into the earth at substantially grazing incidence. It is not to be inferred, however, that this is a necessary requirement, for it is clearly evident that either of the methods is operative when the incident waves enter the earth at various arbitrary angles. Apparatus and methods adapted to the transmission of waves into the earth at selected angles of incidence are described in applicant and G. J. Baker's copending application Serial No. 472,976, filed January 20, 1943, which is now abandoned, and in applicant's aforesaid copending applications Serial No. 483,638, which is abandoned, and Serial No. 584,960.

In describing the theory on which the herein disclosed methods are based, it has been assumed that the said methods involve the use of plane electromagnetic waves, whereas spherical waves generally are employed in practice. The assumption is believed justified, however, because of the simplification afforded by the plane-wave theory, and because the results actually obtained with the said methods agree within engineering tolerances with the theoretical expectations.

When practicing the various methods herein described and hereinafter claimed, it is to be understood that the performance of the said methods does not necessarily require the solution of one or more of the several equations that may relate to the said methods. Where the result of a method may be expressed in algebraic form, it is obvious that the same result may be obtained from a family of curves or nomographs based on predetermined constants and variables, or it may be obtained from tabu'ated data of similar character, so that after the preliminary steps of a method have been performed, the result of the said method is immediately available from the said curves, or nomographs, or tabulated data, without recourse to any mental step.

It is to be understood that various modifications may be in the methods hereinbefore disclosed, and in the apparatus referred to for carrying out the said methods, without departing from the spirit of the invention as defined in the following claims.

What is claimed as new and useful is:

1. The method of determining the presence and depth of an underground mass having an anomalous index of refraction, comprising propagating electromagnetic waves along the earth's surface so as to refract some of the said waves therein, receiving the said waves at successive points along a traverse located above and adjacent to the said mass and directed substantially toward the source of the said waves, measuring at the said points the tilt of the wave front associated with the said waves, and measuring the distance between the source of the said waves and the nearest point along the said traverse at which anomalous tilt angles are observed, the occurrence of the said anomalous tilt angles being indicative of the presence of the said underground mass, and the said distance being a measure of the depth of the said mass.

2. The method of locating the boundary of a buried oil accumulation or other similar electrical discontinuity, comprising propagating electromagnetic waves substantially along the earth's surface above and adjacent to the said boundary, and determining the variation in the tilt of the wave front associated with the said waves along a traverse that passes over the said boundary and is directed substantially toward the source of the said waves, the presence of the said boundary being indicated by a departure from normal in the said variation that occurs substantially vertically above the said boundary and another departure from normal in the said variation that occurs at a location farther removed from the source of the said waves, the separation along the said traverse of the two said departures being a measure of the depth of the said boundary.

3. The method of investigating earth formations including a reflector of electromagnetic waves lying beneath the surface of the earth, comprising simultaneously propagating from a sending point electromagnetic waves of a selected frequency through the air and along the earth's surface to a receiving point in a manner adapted to simultaneously and progressively refract some of said waves into the earth and downward along multiple substantially parallel paths onto said reflector and thence to said receiving point, measuring at said receiving point the tilt of the resultant wave front of the combined waves arriving at said receiving point, varying the spread between said sending point and said receiving point through a spread range sufficient to produce successive maxima or minima in the values of said tilt, wherein the occurrence of said successive maxima or minima is indicative of the presence of a reflector that dips with respect to the earth's surface and the spread between said successive maxima or minima is a measure of the dip of said reflector.

4. The method of locating the boundary of a buried oil accumulation or other similar electrical discontinuity occurring in an earth formation that reflects electromagnetic waves, comprising simultaneously propagating from a sending point electromagnetic waves through the air to a receiving point and through the earth to said formation and thence to said receiving point; measuring at said receiving point the tilt of the resultant wave front of the combined waves arriving at said receiving point; varying the spread between said sending point and said receiving point, by moving said receiving point along a traverse that passes over said boundary and is directed substantially toward said sending point, until the presence of said boundary is indicated by a departure from normal in said variation that occurs substantially vertically above said boundary; and continuing to vary the spread between said sending point and said receiving point until another such departure from normal occurs at a location farther removed from said sending point, the separation along said traverse of the two said departures bearing a predetermined relation to the depth of said boundary.

5. The method set forth in claim 4, wherein said sending point is positioned over said oil accumulation.

6. The method set forth in claim 4, wherein the simultaneous propagation of said waves from said sending point is carried out by propagating from said sending point electromagnetic waves through the air along the earth's surface to said receiving point in a manner adapted to simultaneously and progressively refract some of said waves into the earth and downward along multiple substantially parallel paths onto said formation and thence to said receiving point, wherein the refracted waves arriving at said receiving point are caused to strike said boundary at a location where the approximate depth of said boundary is known.

7. The method of investigating earth formations including a reflector of electromagnetic waves lying beneath the surface of the earth, comprising simultaneously propagating from a sending point electromagnetic waves through the air to a receiving point and through the earth to said reflector and thence to said receiving point, measuring at said receiving point the tilt of the resultant wave front of the combined waves arriving at said receiving point, varying the frequency of said waves through a frequency range sufficient to produce successive maxima or minima in the values of said tilt, wherein the occurrence of said successive maxima or minima in the values of said tile is indicative of the presence of said reflector and the incremental frequency between said successive maxima or minima is a measure of the depth of said reflector.

8. The method of determining the presence and location of the boundary of a buried oil accumulation or other similar electrical discontinuity occurring in an earth formation that reflects electromagnetic waves, comprising simultaneously propagating from a sending point electromagnetic waves through the air to a receiving point and through the earth to said formation and thence to said receiving point, said sending point and said receiving point being located above, adjacent to and on opposite sides of said boundary, measuring at said receiving point the tilt of the resultant wave front of the combined waves arriving at said receiving point, varying the frequency of said waves through a frequency range sufficient to produce successive maxima or minima in the values of said tilt and to cause the apex of the angular path traveled by said waves in said earth to cross said boundary, wherein the presence of said boundary is indicated by a change in the amplitude of said successive maxima or minima as said apex moves from one side of said boundary to the other side of said boundary, and the location of said boundary falls below and between said sending point and said receiving point.

9. The method of obtaining geological and geoelectrical information concerning the earth, comprising transmitting from a sending point electromagnetic waves onto the surface of the earth so as to refract some of the said waves therein, measuring at a receiving point the tilt of the wave front associated with the said waves, and varying the spread between the said sending point and the said receiving point, characteristic variations in said tilt being indicative of the reception of waves returned to the said receiving point by subsurface reflectors, said variations providing a basis for determining desired geological and geoelectrical information from the presence and character of the said variations.

10. The method of determining the presence and depth of a subsurface mass having an anomalous index of refraction, comprising transmitting from a sending point electromagnetic waves along the earth's surface so as to refract some of the said waves therein, measuring at a receiving point the tilt of the wave front associated with the said waves, and varying progressively the spread between the said sending point and the said receiving point so as to maintain at least one of the said points above and adjacent to the said mass, anomalous variations in said tilt being indicative of the reception of waves reflected by the said mass, and the minimum spread at which the said anomalous variations occur being a measure of the depth of the said mass.

11. The method of ascertaining geological and geoelectrical information concerning the earth, comprising so transmitting electromagnetic waves onto the surface of the earth that some of the said waves are refracted therein and some of the said waves travel directly to a receiving point spaced apart from the source of the said waves, measuring at the said receiving point the tilt of the wave front associated with the waves there received, and varying the spread between the said receiving point and the said source to find the variation of the said tilt as a function of the said spread, recurrent anomalies in said variation being indicative of the reflection of waves by a subsurface reflector that dips with respect to the said surface.

12. The method of determining the lateral configuration and depth of an oil accumulation by means of contact breaks, delayed breaks and delayed-break spreads, comprising propagating electromagnetic waves substantially along the earth's surface from a sending point positioned above the said oil accumulation, and measuring the variations in the tilt of the wave front associated with the said waves along radial traverses that pass over the peripheral boundary of the said oil accumulation and are directed substantially toward the said sending point, the said boundary lying substantially vertically below the contact breaks developed on the said traverses, and the delayed-break spreads being a measure of the depth of the said boundary.

13. The method of investigation relating to the refractive index of the geologic section overlying a reflector of electromagnetic waves whose depth is known, comprising propagating electromagnetic waves along the earth's surface so as to refract some of the said waves therein, receiving the said waves at successive points along a traverse located above and adjacent to the said reflector and directed substantially toward the source of the said waves, measuring at the said points the tilt of the wave front associated with the said waves, and measuring the distance between the source of the said waves and the nearest point along the said traverse at which anomalous tilt angles are observed which are caused by the reception of waves that are reflected by the said reflector, in order to determine the said refractive index by algebraic processes, the said refractive index varying inversely as the said distance for a given depth of the said reflector.

14. The method of determining the refractive index of the geologic media overlying the boundary of a buried oil accumulation or other similar electrical discontinuity that lies at a known depth by means of a contact break, delayed break and delayed-break spread, comprising propagating electromagnetic waves substantially along the earth's surface above and adjacent to the said boundary, measuring the variation of the tilt of the wave front associated with the said waves along a traverse that passes over the said boundary and is directed substantially toward the source of the said waves, and measuring the distance between the contact break and delayed break related to said boundary, in order to determine the said refractive index by algebraic processes, the said refractive index varying inversely as the spread between the said contact break and delayed break for a given depth of the said boundary.

15. The method of investigation relating to the refractive index, dielectric constant and conductivity of the geologic media overlying the boundary of a buried oil accumulation or other similar electrical discontinuity that lies at a known depth by means of contact breaks and delayed breaks, comprising transmitting electromagnetic waves of a particular frequency substantially along the earth's surface above and adjacent to the said boundary, measuring the variation in tilt of the wave front associated with the said waves along a traverse that passes over the said boundary and is directed substantially toward the source of the said waves in order to find the contact break and the delayed break related to the said boundary and shown by the said variation, whereby the refactive index of the said media may be determined by algebraic processes involving the said known depth and the spread between the said contact break and the said delayed break; and repeating the foregoing procedure in order to find the refractive index at a frequency different from the said particular frequency, whereby the dielectric constant and conductivity of the said media may be determined by algebraic processes involving the predetermined values of the refractive index.

16. The method of investigating the effectiveness with which electrical energy of different frequencies is transmitted through the geologic media overlying a subsurface reflector of the said energy, comprising transmitting and refracting electromagnetic waves of a particular frequency into the earth above and adjacent to the said reflector, measuring the tilt of the wave front associated with the said waves after their reflection by the said reflector, and repeating the foregoing operations at frequencies that are different from the said particular frequency, variations in the relation between the frequencies employed and the respective magnitudes of the said tilt being indicative of the effectiveness with which the said electrical energy is transmitted through the said geologic media.

17. The method of determining the presence of a subsurface mass having an anomalous index of refraction, comprising so transmitting electromagnetic waves onto the surface of the earth that some of the said waves are refracted therein and some of the said waves travel substantially along the said surface to a receiving point spaced apart from the source of the said waves, measuring at the said receiving point the tilt of the wave front associated with the waves there received, and varying the frequency of the said waves transmitted from the said source, anomalous variations in said tilt being indicative of the reception of waves reflected by a subsurface mass having an anomalous index of refraction.

18. The method of determining the presence of a subsurface electrical discontinuity, comprising so transmitting electromagnetic waves onto the surface of the earth that some of the said waves are refracted therein and some of the said waves travel substantially along the said surface to a receiving point spaced apart from the source of the said waves, measuring at the said receiving point the tilt of the wave front associated with the waves there received, and varying the frequency of the transmitted waves until the apex of the angular path traveled by the waves in the said earth is caused to lie substantially at the said discontinuity, anomalous variations in the said tilt that are caused by the reflection of waves at the said discontinuity being indicative of the presence of the said electrical discontinuity.

19. The method of investigating earth formations including a reflector of electromagnetic waves lying beneath the surface of the earth, comprising simultaneously propagating from a sending point electromagnetic waves of a selected frequency through the air to a receiving point and through the earth to said reflector and thence to said receiving point, measuring at said receiving point the tilt of the resultant wave front of the combined waves arriving at said receiving point, varying the spread between said sending point and said receiving point until the magnitude of said spread reaches a particular value as indicated by an anomalous variation in said tilt that bears a predetermined relation to the depth of said reflector as expressed by the formula:

$$D = \frac{S_m \sqrt{n^2-1}}{2}$$

where D is the depth of said reflector, $S_m$ is the spread and $n$ is the refractive index of the strata overlying said reflector, whereat the occurrence of anomalous variations in said tilt is indicative of the presence of said reflector and the magnitude of said spread when said particular value is reached in a measure of the depth of said reflector.

20. The method set forth in claim 19, wherein the step of varying the spread between said sending point and said receiving point is carried out entirely by a progressive movement of said receiving point.

21. The method set forth in claim 19, wherein the step of varying the spread between said sending point and said receiving point is carried out entirely by a progressive movement of said sending point.

22. The method set forth in claim 19, wherein the step of varying the spread between said sending point and said receiving point is carried out by substantially equal and opposite movements of said sending point and said receiving point.

23. The method set forth in claim 19, wherein the simultaneous propagation of said waves from said sending point is carried out by propagating from said sending point electromagnetic waves through the air and along the earth's surface to said receiving point in a manner adapted to simultaneously and progressively refract some of said waves into the earth and downward along multiple substantially parallel paths onto said reflector and thence to said receiving point.

24. The method set forth in claim 23, wherein the refracted waves arriving at said receiving point are caused to strike said reflector at a location where the approximate depth of said reflector is known.

25. The method set forth in claim 24, including repeating the aforesaid operations at a frequency different from said selected frequency.

26. The method set forth in claim 19, including repeating the aforesaid operations at various frequencies that are different from said selected frequency, said various frequencies extending over a sufficient frequency range to disclose an increase and a decrease in the magnitude of said anomalous variations caused by said reflector, wherein a maximum in said magnitude signifies a transmission band for the earth media overlying said reflector and a minimum in said magnitude signifies an absorption band for said media.

WILLIAM M. BARRET.

REFERENCES CITED

The following references are of record in the file of this patent:

UNITED STATES PATENTS

| Number | Name | Date |
|---|---|---|
| 1,718,352 | Guilford | June 25, 1929 |
| 1,843,407 | Sundberg | Feb. 2, 1932 |
| 2,077,707 | Melton | Apr. 20, 1937 |
| 2,172,688 | Barret | Sept. 12, 1939 |
| 2,426,918 | Barret | Sept. 2, 1947 |

OTHER REFERENCES

"Geophysical Exploration." Heiland, pages 627, 651–656, 805–809, 817–818, publ. 1940 by Prentice-Hall, Inc., N. Y. C.